(12) United States Patent
Ahn et al.

(10) Patent No.: US 7,574,241 B2
(45) Date of Patent: Aug. 11, 2009

(54) SLIDING/FOLDING-TYPE PORTABLE APPARATUS

(75) Inventors: Chi-Young Ahn, Seoul (KR); Young S. Kim, Los Altos, CA (US); Chang-Hwan Hwang, Goyang-si (KR)

(73) Assignee: Samsung Electronics Co., Ltd (KR)

( * ) Notice: Subject to any disclaimer, the term of this patent is extended or adjusted under 35 U.S.C. 154(b) by 12 days.

(21) Appl. No.: 11/122,185

(22) Filed: May 4, 2005

(65) Prior Publication Data

US 2005/0266897 A1  Dec. 1, 2005

Related U.S. Application Data

(60) Provisional application No. 60/568,974, filed on May 6, 2004.

(30) Foreign Application Priority Data

Apr. 6, 2005 (KR) ...................... 10-2005-0028428

(51) Int. Cl.
*H04M 1/00* (2006.01)
(52) U.S. Cl. ............... 455/575.1; 455/575.3; 455/575.4
(58) Field of Classification Search ... 455/575.1–575.9, 455/550.1; 248/278.1; *H04M 1/00*
See application file for complete search history.

(56) References Cited

U.S. PATENT DOCUMENTS

| 6,587,675 | B1 | 7/2003 | Riddiford |
| 6,714,802 | B1 | 3/2004 | Barvesten |
| 6,728,557 | B1 * | 4/2004 | Tracy et al. ............... 455/575.3 |
| 6,766,181 | B1 * | 7/2004 | Newman et al. ......... 455/575.3 |
| 6,892,082 | B2 * | 5/2005 | Boesen ..................... 455/575.3 |
| 2003/0202656 | A1 * | 10/2003 | Ikeuchi et al. ............... 379/419 |
| 2003/0206394 | A1 | 11/2003 | Ossia |
| 2004/0082367 | A1 * | 4/2004 | Nakanishi et al. ........... 455/566 |
| 2004/0227045 | A1 * | 11/2004 | An et al. ................... 248/278.1 |

FOREIGN PATENT DOCUMENTS

| EP | 1 406 427 | 10/2003 |
| EP | 1 411 707 | 10/2003 |
| WO | WO 2004/028010 | 4/2004 |

* cited by examiner

*Primary Examiner*—Alexander Eisen
*Assistant Examiner*—David Wang
(74) *Attorney, Agent, or Firm*—The Farrell Law Firm, LLP

(57) ABSTRACT

A sliding/folding-type portable apparatus includes a body housing; a sliding housing adapted to travel along the longitudinal direction of the body housing while continuously facing it to expose or hide the top surface of the body housing; a folding housing adapted to rotate about a first hinge axis to fold on or unfold from the sliding housing and to rotate about a second hinge axis, which is perpendicular to the first hinge axis, to reverse the top and bottom surfaces thereof; and a dual-axis hinge sliding module connected between the sliding housing and the folding housing to provide the folding housing with the first and second hinge axes.

11 Claims, 6 Drawing Sheets

SLIDING/FOLDING-TYPE PORTABLE APPARATUS

PRIORITY

This application claims priority to an application entitled "Sliding/Folding-Type Portable Apparatus" filed with the U.S. Patent Office on May 6, 2004 and assigned Ser. No. 60/568,974 and an application entitled the same filed with the Korean Intellectual Property Office on Apr. 6, 2005 and assigned Ser. No. 2005-28428, the contents of which are incorporated herein by reference.

BACKGROUND OF THE INVENTION

1. Field of the Invention

The present invention relates to portable apparatuses with a digital communication mode including cellular phones, PDAs (Personal Digital Assistants), HHPs (Hand Held Phones), game phones, TV phones, chatting phones, and camera phones, and more particularly to a portable apparatus combining a sliding motion with a folding motion.

2. Description of the Related Art

In general, "portable communication apparatus" refers to an electronic apparatus that a user can carry to perform wireless communication. To facilitate portability, designs of such portable communication apparatuses tend to be compact, slim, and light, and are moving toward providing multimedia availability, with a wider variety of functions. In particular, future portable communication apparatuses will incorporate greater multi-functionality and be capable of multi-purpose utilization, in addition to being even more compact and light. Future designs will also incorporate the ability for modification to be suitable for various multimedia or Internet environments. Portable communication apparatuses are now commonly used by people of all ages and all walks of life throughout the world, and are recognized by most consumers as a nearly indispensable commodity to be carried all the time.

Conventional portable communication apparatuses may be classified into various categories according to appearance, such as a bar-type portable communication apparatus, a flip-type portable communication apparatus, and a folder-type portable communication apparatus. Portable communication apparatuses may also be classified as neck wearable or wrist wearable according to the position or way in which a user wears the portable communication apparatus. In addition, portable communication apparatuses may be classified into a rotation-type portable communication apparatus and a sliding-type portable communication apparatus according to the manner of opening and closing the portable communication apparatus. These variously classified portable communication apparatuses can be easily understood by those skilled in the art.

Conventional portable communication apparatuses can now transmit data wirelessly at a high speed in addition to performing basic voice communication function in response to consumers' demand.

Recent trends in portable communication apparatus design tend to include a camera lens to obtain video signals for transmission. Current portable communication apparatuses have an external or embedded camera lens module that enables a user to perform video communication with a desired partner or to photograph a desired subject.

However, sliding-type or folding-type conventional portable communication apparatuses have a problem in that, although they necessarily have a display device and a number of keys, the display device is difficult to watch while the apparatus is horizontal, and the keys are inconvenient to operate.

In a multimedia-oriented environment accommodating various consumer-friendly media, for example, a single portable apparatus is expected to incorporate not only a voice communication function, but also video communication, game, music listening, TV or video watching, chatting, and Internet functions as a whole. As a result of such change in telecommunication environments, it is desirable to actively cope with various user interfacing environments. In consideration of usability of portable apparatuses, the user interfacing environments dictate the convenience of portable apparatuses.

In the user interface environment of a single portable apparatus, therefore, the most critical factor is the convenience in the data input and output interfacing environments. The present invention provides the optimum interfacing environment from the viewpoint of users, in consideration of the advantages of sliding-type and folding-type portable apparatuses.

SUMMARY OF THE INVENTION

Accordingly, the present invention has been made to solve the above-mentioned problems occurring in the prior art, and an object of the present invention is to provide a portable apparatus which combines the advantages of a sliding-type portable apparatus with those of a folding-type portable apparatus and which, particularly, provides a wider display device, convenience in key operation, and adaptability to compactness.

Another object of the present invention is to provide a portable apparatus having convenient data input interfacing in various modes, including a game mode, a chatting mode, an Internet mode, a TV watching mode, a video watching mode, and a camera photographing mode.

Another object of the present invention is to provide a portable apparatus having a number of keyboards positioned on each of three housings for convenient key operation.

Another object of the present invention is to provide a portable apparatus having a numeric keyboard positioned on a body housing for convenient watching in the vertical direction, an alphabet character keyboard positioned on a sliding housing for convenient watching in the horizontal direction, and a function keyboard positioned on a folding housing for convenient watching in the vertical direction to optimize the user interfacing environment.

Another object of the present invention is to provide a portable apparatus having convenient user interfacing in a chatting mode.

In order to accomplish these objects, there is provided a portable apparatus including a body housing; a sliding housing adapted to travel along the longitudinal direction of the body housing while continuously facing it to expose or hide the top surface of the body housing; a folding housing adapted to rotate about a first hinge axis to fold on or unfold from the sliding housing and to rotate about a second hinge axis, which is perpendicular to the first hinge axis, to reverse the top and bottom surfaces thereof; and a dual-axis hinge sliding module connected between the sliding housing and the folding housing to provide the folding housing with the first and second hinge axes.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein is omitted to avoid making the subject matter of the present invention unclear.

Figure 1:
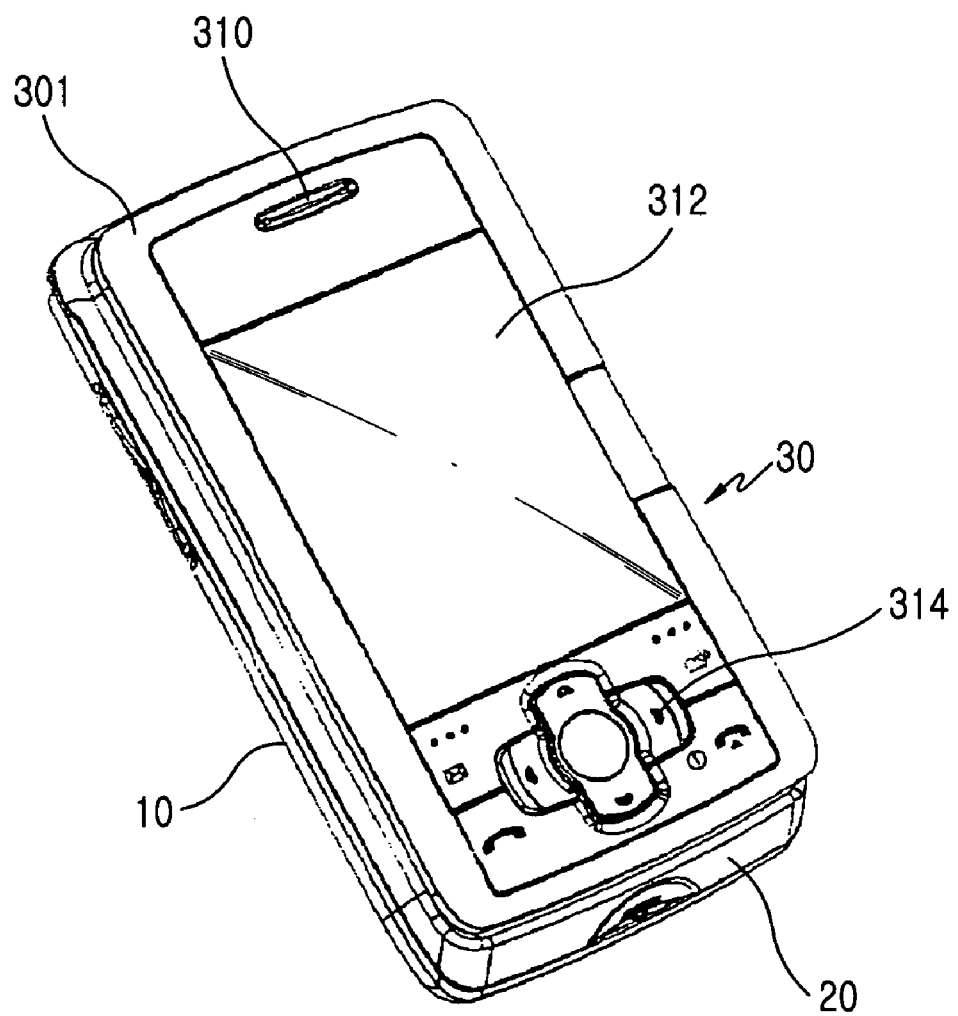
FIG. 1 is a perspective view illustrating a sliding/folding-type portable apparatus according to a preferred embodiment of the present invention.
Figure 2:
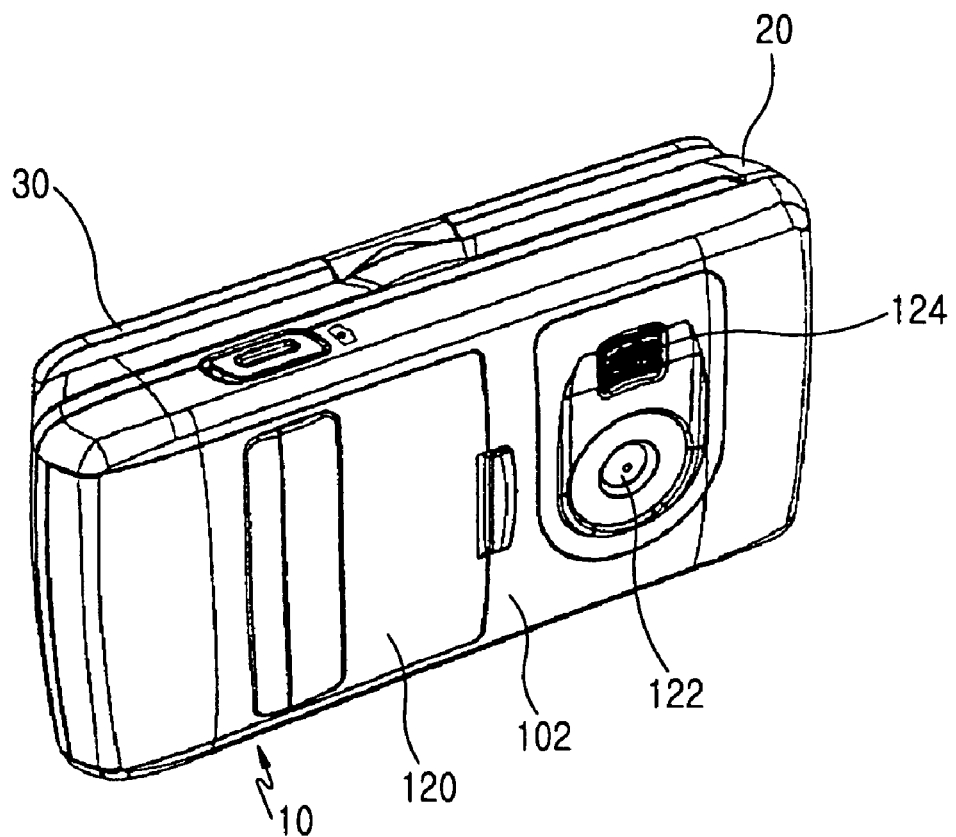
FIG. 2 is a rear perspective view the portable apparatus of FIG. 1.

As shown in FIGS. 1 and 2, a sliding/folding-type portable apparatus according to the present invention includes a body housing 10, a sliding housing 20, and a folding housing 30, all of which have the shape of a plate. As shown in FIG. 1, the folding housing 30 has a speaker device 310, a display device 312, and a third keyboard 314 positioned on the top surface 301 thereof. The speaker device 310 is adjacent to the display device 312, which is adjacent to the third keyboard 314. The third keyboard 314 is mainly composed of function keys. The display device 312 may be composed of an LCD or a touch screen.

As shown in FIG. 2, the body housing 10 has a battery pack 120, a camera lens 122, and a lighting device 124 positioned on the bottom surface thereof 102. The battery pack 120 is adjacent to the camera lens 122, which is adjacent to the lighting device 124. The battery pack 120 is detachable.

Figure 3:
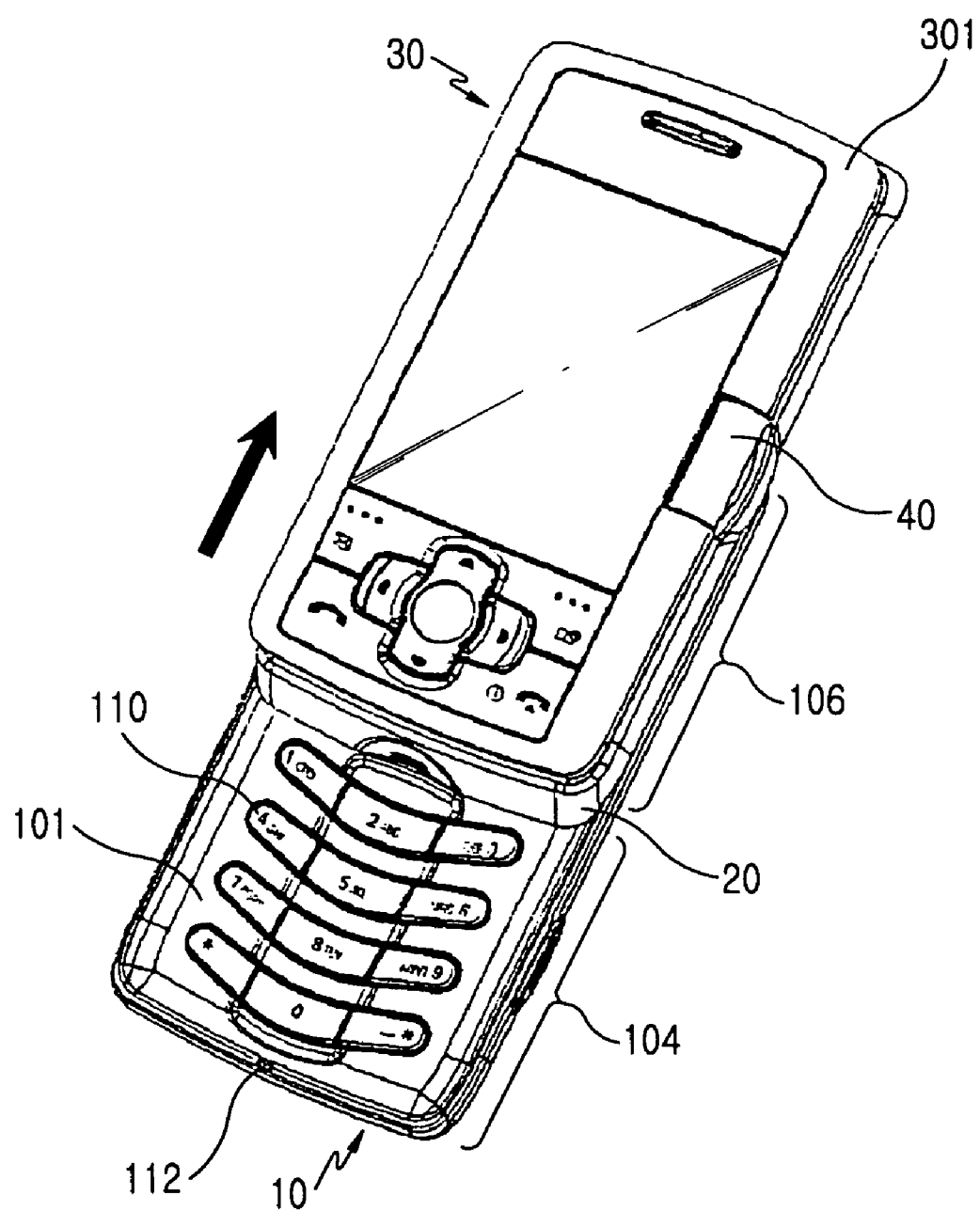
FIG. 3 is a perspective view illustrating a sliding/folding-type portable apparatus, after sliding, according to a preferred embodiment of the present invention.
Figure 4:
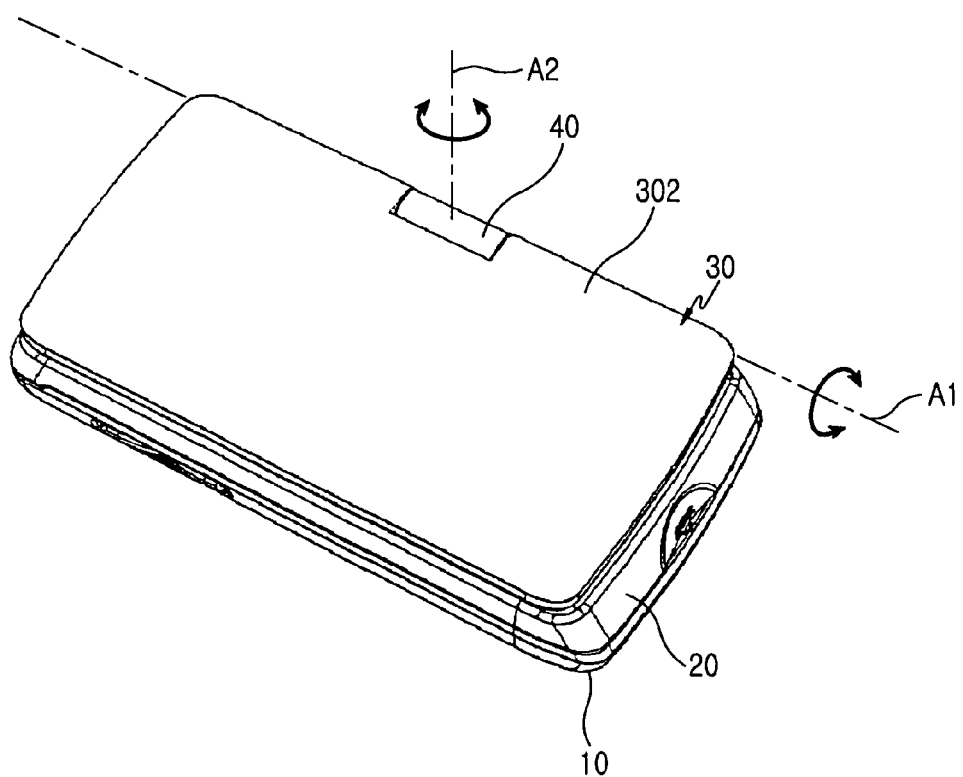
FIG. 4 is a perspective view illustrating a folding housing, after full movement about first and second hinge axes, according to a preferred embodiment of the present invention.

As shown in FIGS. 3 to 6, a portable apparatus according to an embodiment of the present invention includes a body housing 10; a sliding housing 20 adapted to travel along the longitudinal direction of the body housing 10 while continuously facing it to expose or hide a predetermined region of the top surface 101 of the body housing 10; a folding housing 30 adapted to rotate about a first hinge axis A1 to fold on or unfold from the sliding housing 20 and to rotate about a second hinge axis A2, which is perpendicular to the first hinge axis A1, to reverse the top and bottom surfaces 301 and 302 thereof; and a dual-axis hinge sliding module 40 connected between the sliding housing 20 and the folding housing 30 to provide the folding housing 30 with the first and second hinge axes A1 and A2. FIG. 3 shows the sliding housing 20 after sliding. FIG. 4 shows the folding housing 30 with its top and bottom surfaces 301 and 302 fully reversed from a position shown in FIG. 1. Particularly, the bottom surface 302 of the folding housing faces the top surface of the sliding housing in a state as shown in FIG. 1 and the top surface 301 of the folding housing faces the top surface of the sliding housing in a state as shown in FIG. 4.

Figure 5:
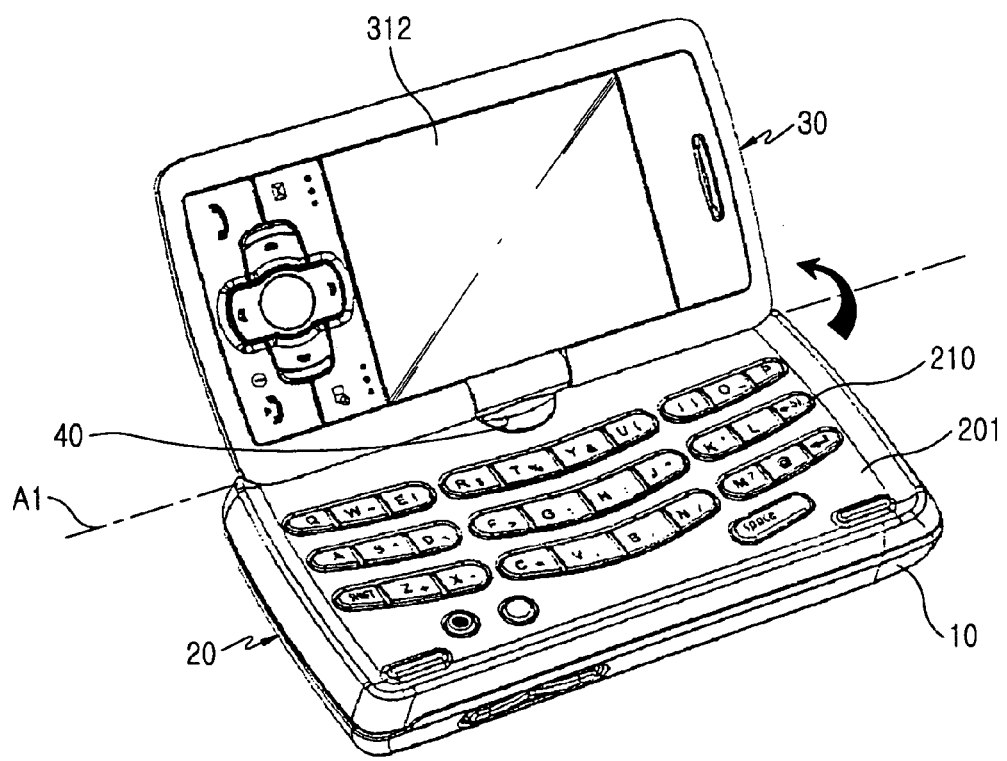
FIG. 5 is a perspective view illustrating the folding housing, when open, of FIG. 4.

The dual-axis hinge sliding module 40 is positioned on a lateral end of the sliding housing 20, particularly at the center of an lateral end thereof. FIG. 5 shows a state wherein the sliding housing 20 is rotated about the first hinge axis A1.

Preferably, the first hinge axis A1 is parallel to the sliding direction of the sliding housing 20 and the second hinge axis A2 is perpendicular both to the first hinge axis A1 and to the sliding direction.

As shown in FIG. 3, the top surface 101 of the body housing includes a first region 104 selectively exposed or hidden according to whether the sliding housing 20 is slid or not and a second region 106 hidden regardless of whether the sliding housing 20 is slid or not. The first and second regions 104 and 106 are adjacent to each other. The first region 104 has a first keyboard 110 composed of an array of a number of keys positioned thereon. The first keyboard 110 is composed of an array of keys convenient to watch in the vertical direction, particularly 3×4 array of numeric keys, as shown in FIG. 3. Reference numeral 112 refers to a microphone device.

As shown in FIG. 5, the sliding housing has a second keyboard 210 positioned on the top surface 201 thereof, which is composed of an array of a number of keys exposed or hidden according to whether the folding housing 30 is folded or not. Particularly, the top surface 201 of the sliding housing and, accordingly, the second keyboard 210 are exposed or hidden according to whether the folding housing 30 is folded or not. The second keyboard 210 is composed of QWERTY key array including alphabet characters, and particularly of an array of keys convenient to use when the apparatus is oriented in the horizontal direction as shown in FIG. 5.

The folding housing 30 is adapted to rotate 0-180° about the first hinge axis A1 and rotate 0-180° about the second hinge axis A2. As the folding housing 30 is rotated about the first hinge axis A1 from a position as shown in FIG. 1, rotated 180° about the second hinge axis A2, and again rotated about the first hinge axis A1, it is folded on the sliding housing 20 as shown in FIG. 4. The bottom surface 302 of the folding housing is preferably a planar surface, as shown in FIG. 6.

Figure 6:
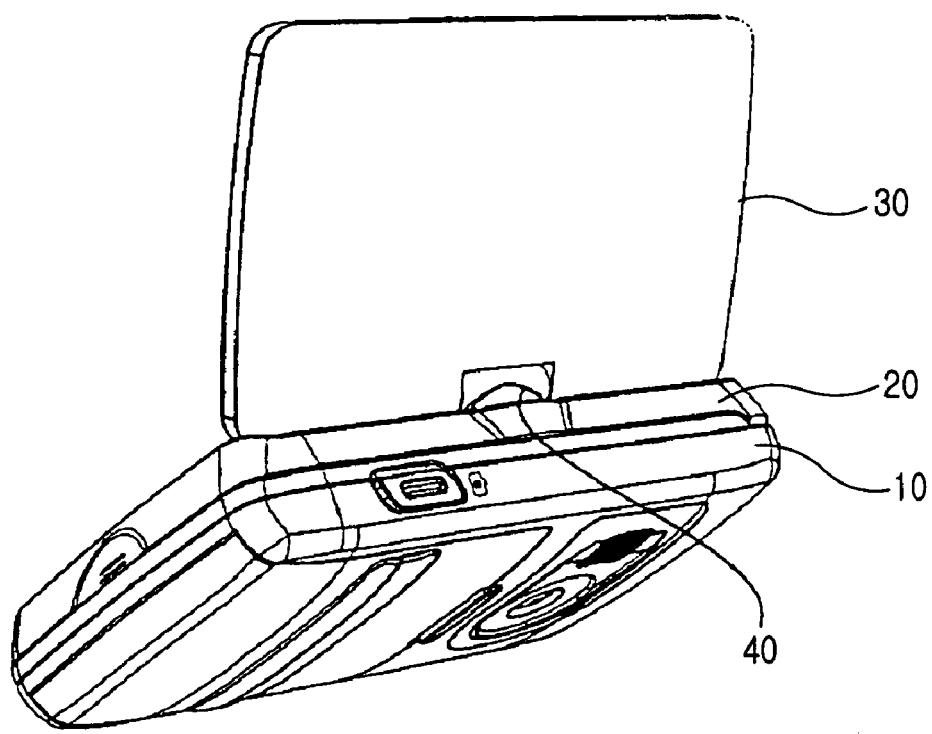
FIG. 6 is a rear perspective view of the folding housing of FIG. 5.

When rotated about the first hinge axis A1 from a position as shown in FIG. 4, the folding housing 30 is positioned as shown in FIG. 5 or 6.

In summary, the state shown in FIG. 1 is suitable for a communication or camera mode, the state shown in FIG. 3 is suitable for a communication mode, and the state shown in FIG. 5 is suitable for a mode requiring complicated key input operation, such as a chatting mode, which is an exchange of text messages.

As mentioned above, the portable apparatus according to the present invention has three housings connected to one another in such a manner that they can slide and fold and provided with respective keyboards. This provides a wider display device, convenience in key operation, and adaptation to compactness. Particularly, the inventive portable apparatus has a numeric keyboard positioned on a body housing for convenient watching of the display when the apparatus is in the vertical direction, an alphabet character keyboard positioned on a sliding housing for convenient use when the apparatus is in the horizontal direction, and a function keyboard positioned on a folding housing for convenient use when the apparatus is in the vertical direction to optimize the user's data input interfacing environment.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable apparatus comprising:
   a body housing having a body top surface including a second region and a first region receiving a first keyboard composed of an array of a number of keys;
   a sliding housing continuously facing the body top surface;
   a folding housing having a first surface and a second surface opposite the first surface, the folding housing rotating about a first hinge axis parallel to a sliding direction along a longitudinal direction of the body housing to fold on or unfold from the sliding housing and rotating about a second hinge axis perpendicular to the first hinge axis to alternate the first surface and the second surface to face the sliding housing, both the sliding housing and the folding housing sliding together with respect to the body housing in the sliding direction to expose or hide the first region, the second region being hidden regardless of whether the sliding housing is slid; and
   a rotating hinge sliding module connected between the sliding housing and the folding housing to provide the folding housing with the first hinge axis, the rotating hinge sliding module being positioned at a center of a lateral end of the sliding housing.

2. The portable apparatus as claimed in claim 1, wherein the rotating hinge sliding module provides the folding housing with the second hinge axis.

3. The portable apparatus as claimed in claim 1, wherein the first region and the second region are adjacent to each other.

4. The portable apparatus as claimed in claim 3, wherein the first keyboard is composed of a 3×4 array of keys.

5. The portable apparatus as claimed in claim 3, wherein the first keyboard is composed of an array of keys for use when the apparatus is in the vertical direction.

6. The portable apparatus as claimed in claim 3, wherein the sliding housing has a second keyboard positioned on a top surface of the sliding housing, the second keyboard is composed of an array of a number of keys, and the top surface of the sliding housing is exposed or hidden according to whether the folding housing is folded.

7. The portable apparatus as claimed in claim 6, wherein the second keyboard is composed of a QWERTY key array including alphabet characters.

8. The portable apparatus as claimed in claim 6, wherein the second keyboard is composed of an array of keys for use when the apparatus is in the horizontal direction.

9. The portable apparatus as claimed in claim 6, wherein the folding housing comprises a display device positioned on the first surface and a third keyboard composed of an array of a number of keys positioned on the first surface and adjacent to the display device.

10. The portable apparatus as claimed in claim 1, wherein a battery pack, a camera lens adjacent to the battery pack, and a lighting device adjacent to the camera lens are provided on a bottom surface of the body housing.

11. The portable apparatus as claimed in claim 2, wherein the folding housing is adapted to rotate 0-180° about the first hinge axis and rotate 0-180° about the second hinge axis.

* * * * *